United States Patent
Cahill

[15] 3,670,391
[45] June 20, 1972

[54] PILOT PIN FOR MOUNTING AUTOMOBILE WHEELS

[72] Inventor: Robert J. Cahill, 913 Rittenhouse Street, Philadelphia, Pa. 19138

[22] Filed: May 6, 1970

[21] Appl. No.: 35,119

[52] U.S. Cl. ............................................. 29/273, 29/200 P
[51] Int. Cl. ................................... B25b 27/14, B23p 19/00
[58] Field of Search .................... 29/200 P, 200 J, 200 R, 273

[56] References Cited

UNITED STATES PATENTS

| | | | |
|---|---|---|---|
| 1,815,821 | 7/1931 | Baker | 29/273 |
| 2,499,758 | 3/1950 | Kayfetz | 29/273 |
| 2,555,698 | 6/1951 | Mashek | 29/273 |
| 3,389,453 | 6/1968 | Tarter et al. | 29/273 |

Primary Examiner—Thomas H. Eager
Attorney—Smith, Harding, Barley & Follmer

[57] ABSTRACT

A pilot pin for assisting in mounting an automobile wheel on a wheel drum, which pilot pin properly aligns selected wheel disk holes with corresponding brake drum holes and holds them in alignment while bolts are inserted and screwed into the remaining aligned holes. The pin includes a body, a threaded stud at one end of the pin adapted to turn into the threads of the brake drum hole, the body being of larger diameter than the brake drum hole and having a body shoulder that contacts the rim of the brake drum hole to form a stop for limiting the penetration of the threaded stud into the drum hole, a head at the other end of the pin which is of larger diameter than the body and of smaller diameter than the wheel disk hole, and a head shoulder on the head for catching and holding a rim of a wheel disk hole to support the wheel disk on the brake drum while the bolts are being inserted into the aligned holes and screwed therein.

6 Claims, 4 Drawing Figures

PATENTED JUN 20 1972　　3,670,391

INVENTOR
ROBERT J. CAHILL
BY
Smith Harding Earley & Follmer
ATTORNEYS

PILOT PIN FOR MOUNTING AUTOMOBILE WHEELS

BACKGROUND OF THE INVENTION

This invention relates to apparatus for assisting in changing the tires of an automobile when the motorist has a flat tire, for example.

The invention is particularly adapted to assist in mounting the spare tire of a Volkswagen onto a brake drum. Unlike automobiles of American make which have threaded studs projecting from the brake drum, the brake drums of a Volkswagen car are provided with threaded holes.

In mounting a wheel on an automobile of American make, the wheel is lifted to the height of the jacked-up brake drum, and the holes in the wheel disk are passed over the projecting brake drum studs which hold the wheel in place while threaded nuts are turned onto the studs to hold the wheel securely on the drum.

However, mounting a wheel onto a Volkswagen brake drum is a more complicated and difficult matter because there are no studs projecting from the brake drum to temporarily hold the wheel in place while the wheel is being securely attached to the drum. Instead, the motorist must lift the wheel into place and hold the wheel disk holes in alignment with the brake drum holes while he is inserting and turning threaded bolts into the aligned holes. Holding the wheel in place usually leaves only one hand for the job of inserting and turning the bolts into the aligned holes, and this is difficult to do especially at night or in bad weather.

SUMMARY OF THE INVENTION

The present invention solves the problem of holding the five Volkswagen wheel and drum holes in alignment by providing a pilot pin that is screwed into one of the drum holes. One of the wheel holes is passed over the pilot pin which holds the wheel hole in proper alignment while the bolts are screwed into the remaining four aligned holes.

In mounting a rear wheel, only one pilot pin is necessary since the brakes hold the brake drum from rotating, but two pilot pins are preferable because the use of two pins automatically aligns the remaining three wheel disk holes with their corresponding brake drum holes.

On the front wheels, two pins are preferable because if only one pin is used, any small rotation of the brake drum causes the brake drum holes to move out of alignment with the wheel disk holes.

BRIEF DESCRIPTION OF THE DRAWINGS

Other objects and advantages of this invention, including its simplicity and economy, as well as the ease with which it may be adapted for use with existing equipment, will further become apparent thereinafter and in the drawings, in which.

DESCRIPTION OF THE PREFERRED EMBODIMENT

Figure 1:
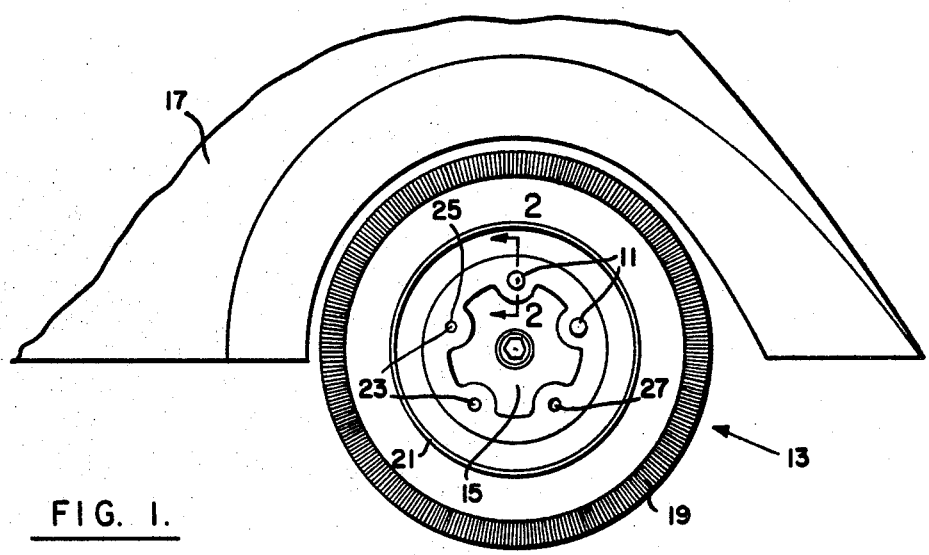
FIG. 1 is a partial view in elevation of a Volkswagen wheel held in place on a brake drum by two pilot pins constructed in accordance with this invention.
Figure 2:
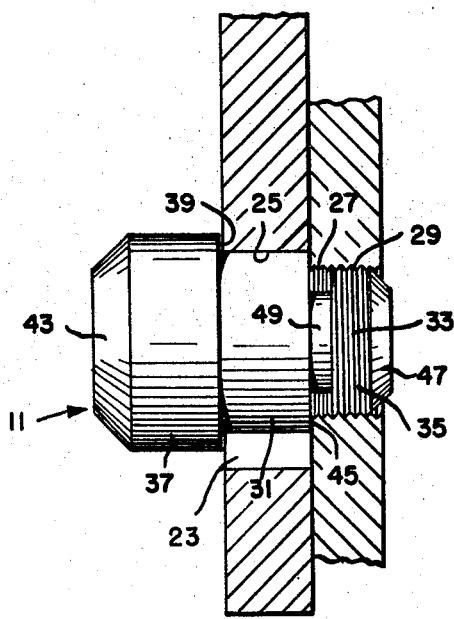
FIG. 2 is an enlarged view in section taken along the lines and arrows 2—2 which appear in FIG. 1 and shows the pilot pin in side elevation.
Figure 3:
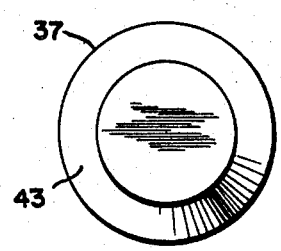
FIG. 3 is a view in elevation of the head end of the pin.
Figure 4:
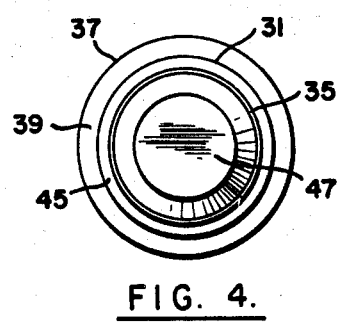
FIG. 4 is a view in elevation of the threaded-stud end of the pin.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown, in FIG. 1, two pilot pins 11 holding a wheel 13 in place on a brake drum 15 of a Volkswagen automobile 17.

Wheel 13 includes a tire 19 mounted on a wheel disk 21 having holes 23 with rims 25, and brake drum 15 includes five mounting holes 27 which match the holes 23 of wheel disk 21 and are provided with internal threads 29.

Pilot pins 11 include a body 31, means located at one end of the pin for mounting the pin in a wheel drum hole, said mounting means comprising a stud 33 having external threads 35, and a head 37 located at the other end of the pin.

Head 37 is of larger diameter than body 31 and is of smaller diameter than wheel disk holes 23. Head 37 has a shoulder 39 facing towards body 31 and head shoulder 39 is adapted to catch and hold a rim 25 of a wheel disk hole 23 to support the wheel and hold the wheel disk holes 23 in alignment with drum holes 27 while bolts are inserted into the aligned holes and screwed into drum holes 27. Head shoulder 39 prevents the wheel disk 21 from sliding off pilot pin 11.

Head 37 is also provided at the end of the pin with a head bevel portion 43 that acts as a lead-in for easier passage of the wheel disk hole 23 over the pilot pin head 37.

Body 31 is of larger diameter than threaded stud 33 and of drum holes 27 and has a body shoulder 45 facing towards threaded stud 33. Body shoulder 45 is wider than the drum hole 27 and thus forms a stop for limiting the penetration of the threaded stud into drum hole 27.

Threaded stud 33 is provided at the end of the pin with a lead-in bevel portion 47 for easier insertion of the pin into the drum hole 27. A neck 49 connects threaded stud 33 with body 31. Neck 49 is of smaller diameter than stud 33 and provides a thread relief for more easily cutting the threads onto stud 33. Without neck 49, it would be difficult to cut threads 35 all the way to body shoulder 45 without damaging body 31.

The slight step or graduation formed by head shoulder 39 acts as a stop to prevent wheel 13 from sliding off pilot pin 11, thereby supporting the wheel 13 and freeing both hands to work at inserting and securing the wheel lug bolts 41.

When threaded stud 33 is inserted into drums holes 27 to the limit, body shoulder 45 is flush against brake drum 15.

In operation, when a motorist is required to change a flat tire, for example, the motorist jacks up the car to place the flat tire in elevated position, unscrews the bolts, and removes the wheel from brake drum 15. Then he screws one, or preferably two, pilot pins 11 into drum holes 27, raises the spare wheel and hangs it onto pilot pins 11 by passing wheel disk holes 23 onto pins 11. The pins 11 support wheel 13 temporarily on drum 15, and also automatically align wheel disk holes 23 with drum holes 27. Both hands of the motorist are now free to insert the bolts into the remaining aligned holes and turn them down. Then the pilot pins 11 are removed, the wheel 13 is held in place by the three bolts that have already been inserted and turned, and the remaining two bolts are inserted and turned. The bolts are tightened and the jack removed in the usual manner.

The present invention has the advantage of being simpler and less expensive than the quite complicated and expensive devices of the prior art. Such devices include the tire installation tool of Tarter et al. U.S. Pat. No. 3,389,453, the wheel mounter of Kayfetz U.S. Pat. No. 2,499,758, and the applicator of Masheck U.S. Pat. No. 2,555,698. Baker U.S. Pat. No. 1,815,821 provides a somewhat simpler device than the other prior art devices, but it does not have the advantageous shoulders of the present invention which prevent the wheel from slipping off and which limit the penetration of threaded stud 33, for example.

It is to be understood that the form of the invention herewith shown and described is to be taken as a presently preferred embodiment. Various changes may be made in the shape, size and arrangement of parts. For example, equivalent elements may be substituted for those illustrated and described therein, and certain features of the invention may be utilized independently of the use of other features, all without departing from the spirit or scope of the invention as defined in the subjoined claims.

I claim:

1. Assembling and securing apparatus consisting of a pilot pin for mounting an automobile wheel on a wheel drum and properly aligning wheel disk holes with brake drum holes to expedite the mounting of the wheel on the drum, which mounting is accomplished by inserting bolts through said aligned wheel disk and drum holes and screwing the bolts into the drum holes, comprising a body, means for mounting the pilot pin in a wheel drum hole, said mounting means being located at one end of the body, and a head at the other end of the body, said head being of larger diameter than the body and smaller diameter than the wheel disk hole, said head having a head shoulder facing towards said body for catching and holding a rim of a wheel disk hole to hold the remaining wheel holes in alignment with the drum holes while bolts are inserted and screwed therein.

2. The pilot pin of claim 1 wherein the head is provided at the end of the pin with a bevel portion which acts as a lead-in for easier passage of the wheel disk hole over the pilot pin head.

3. The pilot pin of claim 1 wherein said mounting means comprises a threaded stud adapted to turn into the threads of the drum hole, and said body is of larger diameter than the threaded stud and has a body shoulder facing towards said threaded stud, said body shoulder being wider than the drum hole so as to form a stop for limiting the penetration of the threaded stud into the drum hole.

4. The pilot pin of claim 3 wherein the threaded stud is provided at the end of the pin with a lead-in bevel portion for easier insertion into the drum hole.

5. The pilot pin of claim 3 wherein a neck connects the threaded stud with the body, said neck being of smaller diameter than said stud.

6. The pilot pin of claim 1, said mounting means comprising a threaded stud adapted to turn into the threads of the drum hole, said body being of larger diameter than the threaded stud and having a body shoulder facing towards said threaded stud, said body shoulder being wider than the drum hole so as to form a stop for limiting the penetration of the threaded stud into the drum hole, said threaded stud being provided at the end of the pin with a lead-in bevel portion for easier insertion into the drum hole, and a head at the other end of the body, said head being of larger diameter than the body and of smaller diameter than the wheel disk hole, said head having a head shoulder facing towards said body for catching and holding a rim of a wheel disk hole to hold the remaining wheel disk holes in alignment with the drum holes while bolts are inserted and screwed therein, said head being provided at the end of the pin with a bevel portion that acts as a lead-in for easier passage of the wheel disk hole over the pilot pin head.

* * * * *